(12) United States Patent
Bona et al.

(10) Patent No.: US 10,750,188 B2
(45) Date of Patent: *Aug. 18, 2020

(54) METHOD AND DEVICE FOR DYNAMICALLY MONITORING THE ENCODING OF A DIGITAL MULTIDIMENSIONAL SIGNAL

(71) Applicant: STMicroelectronics (Grenoble 2) SAS, Grenoble (FR)

(72) Inventors: Mariano Bona, Grenoble (FR); Fritz Lebowsky, St. Martin d'Uriage (FR)

(73) Assignee: STMICROELECTRONICS (GRENOBLE2) SAS, Grenoble (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,106

(22) Filed: May 14, 2019

(65) Prior Publication Data

US 2019/0268600 A1 Aug. 29, 2019

Related U.S. Application Data

(63) Continuation of application No. 15/691,221, filed on Aug. 30, 2017, now Pat. No. 10,313,676.

(30) Foreign Application Priority Data

Jan. 17, 2017 (FR) ...................................... 17 50340

(51) Int. Cl.
*H04N 19/154* (2014.01)
*H04N 19/132* (2014.01)
(Continued)

(52) U.S. Cl.
CPC ......... *H04N 19/154* (2014.11); *H04N 19/103* (2014.11); *H04N 19/132* (2014.11);
(Continued)

(58) Field of Classification Search
CPC .. H04N 19/102; H04N 19/103; H04N 19/105; H04N 19/109; H04N 19/11
See application file for complete search history.

(56) References Cited

U.S. PATENT DOCUMENTS 6,944,224 B2 * 9/2005 Zhao .................... H04N 19/124
375/240.12
7,751,633 B1 7/2010 Mukherjee
(Continued)

FOREIGN PATENT DOCUMENTS

EP 3203737 A1 8/2017
FR 3047381 A1 8/2017

OTHER PUBLICATIONS

Baghaie, Ahmadreza et al., "Structure Tensor Based Image Interpolation Method", 14 pages, http://arxiv.org/ftp/arxiv/papers/1402/1402.5564.pdf.
(Continued)

*Primary Examiner* — Dominic D Saltarelli
(74) *Attorney, Agent, or Firm* — Slater Matsil, LLP

(57) ABSTRACT

A method is provided for encoding a digital signal as an encoded signal. The method includes performing a plurality of localized encodings of a digital signal to generate a set of encoded local signals. Localized encodings are performed for a first sample of the digital signal. A plurality of physical quantities is assigned to the first sample. The set of encoded local signals includes an encoded local signal associated with each physical quantity of the plurality of physical quantities. The method further includes analyzing a characteristic associated with an encoded signal to determine a measured value of the characteristic. The encoded signal includes the set of encoded local signals. The method also includes adjusting a first encoding parameter associated with the plurality of localized encodings according to the measured value of the characteristic and a target value of the
(Continued)

characteristic. The first encoding parameter is adjusted for a second sample of the digital signal. The second sample is processed after the first sample.

20 Claims, 16 Drawing Sheets

(51) Int. Cl.
*H04N 19/196* (2014.01)
*H04N 19/176* (2014.01)
*H04N 19/895* (2014.01)
*H04N 19/182* (2014.01)
*H04N 19/15* (2014.01)
*H04N 19/103* (2014.01)
*H04N 19/593* (2014.01)

(52) U.S. Cl.
CPC .......... *H04N 19/15* (2014.11); *H04N 19/176* (2014.11); *H04N 19/182* (2014.11); *H04N 19/196* (2014.11); *H04N 19/895* (2014.11); *H04N 19/593* (2014.11)

(56) References Cited

U.S. PATENT DOCUMENTS

| | | | | |
|---|---|---|---|---|
| 8,345,776 B2* | 1/2013 | Xiong | .................. | H04N 19/105 375/240.01 |
| 9,544,597 B1* | 1/2017 | Han | .................... | H04N 19/176 |
| 2010/0054613 A1* | 3/2010 | Henry | ...................... | G06T 9/20 382/233 |
| 2016/0198156 A1 | 7/2016 | Jung et al. | | |
| 2017/0223358 A1 | 8/2017 | Bona et al. | | |
| 2017/0237980 A1 | 8/2017 | Han et al. | | |
| 2018/0205955 A1 | 7/2018 | Bona et al. | | |

OTHER PUBLICATIONS

IEEE, "Adaptive Regularization With the Structure Tensor", Abstract, Published in IEEE Transactions on Image Processing, vol. 24, Issue 6, Jun. 2015, 3 pages.

MIA Group, Saarland University, "Image Processing of Tensor Fields", 7 pages, http://www.mia.uni-saarland.de/Research/IP_Tensor.shtml.

Zimmer, Henning Lars, "PDE-based Image Compression using Corner Information", Master's Thesis, Saarland University, Sep. 17, 2007, 137 pages.

Tschumperle, David, et al., "Regularization of Multivalued Images by EDP: A Common Formalism for Different Applications", INRIA Sophia-Antipolis, 8 pages, https://tschumperle.users.greyc.fr/publications/tschumperle_taima03.pdf.

Lebowsky, Fritz, et al., "How suitable is structure tensor analysis for real-time color image compression in context of high quality display devices", Society for Imaging Science and Technology, vol. 2016, No. 20, Feb. 14, 2016, 8 pages.

Rodriguez, J. Bacca, et al., "Blue-Noise Multitone Dithering", IEEE Transactions on Image Processing, vol. 17, No. 8, Aug. 2008, pp. 1368-1382.

* cited by examiner

| position A | STRC |
|---|---|
| ECH 2 | 0 0 |
| ECH 3 | 0 1 |
| ECH 4 | 1 0 |
| ECH 5 | 1 1 |

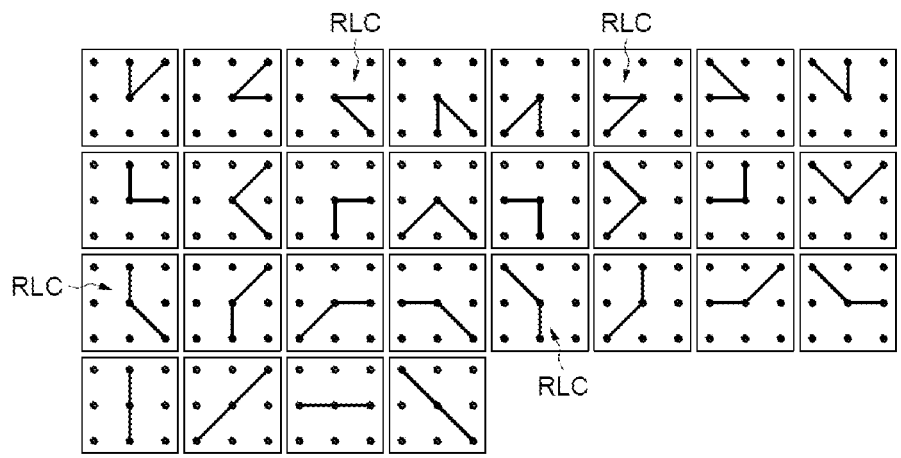

METHOD AND DEVICE FOR DYNAMICALLY MONITORING THE ENCODING OF A DIGITAL MULTIDIMENSIONAL SIGNAL

CROSS-REFERENCE TO RELATED APPLICATIONS

This application is a continuation application of U.S. application Ser. No. 15/691,221, filed on Aug. 30, 2017, which claims priority to French Patent Application No. 1750340, filed on Jan. 17, 2017, which applications are hereby incorporated herein by reference in their entirety.

TECHNICAL FIELD

Embodiments relate to a method and device for dynamically monitoring the encoding of a digital multidimensional signal.

BACKGROUND

Generally, in the image processing context, an image frame to be displayed on a screen, for example, a television screen, is represented by a matrix structure of digital information representing a grid of pixels and each pixel has several color components assigned to it, for example, the brightness component Y and chrominance components Cr and Cb each having a level or amplitude for the pixel considered. Such a structure of pixels or "bit map" therefore corresponds, bit-for-bit or pixel-by-pixel, to the image (then called "raster" image) which has to be displayed on the screen. Also, generally, the structure of pixels is generally in the same format as that used for the storage in the video memory of the screen. And, the raster frame thus stored in the video memory will be read pixel-by-pixel on a line and line-by-line. This is then called "raster scan".

Currently, the size of the frames used for high definition digital television, called HDTV, is a so-called "2k1k" size, that is to say comprising 1080 lines of 1920 pixels. Moreover, the frequency, that is to say the number of frames per second, is 60 Hz.

To transmit such an image signal delivered by the TV decoder, over the wired link linking this decoder to the television, it is necessary to perform a compression of the image signal delivered by the decoder. In effect, transmitting such an image signal without compression requires extremely high transverse speeds which are generally costly and create electromagnetic interferences.

This is why the signal delivered by the decoder is compressed.

Compression/decompression processing operations can also be necessary for the storage of the images in a memory internal or external to the decoder.

In effect, a video signal is generally received in an encoded format, for example, according to the H264 or HEVC standards, then is decoded into an image format of the RGB or $YC_bC_r$ type that is more bulky in terms of memory space.

Now, various processing operations are usually applied to the decoded images. Also, between each processing operation, the images are stored, for example, in buffer memories, in the decoded format. In order to limit the capacity of the memories used, it is advantageous to perform a compression of the decoded images before storage in the memory followed by a decompression on reading in the memory before processing.

Such compressions/decompressions must not introduce image degradations.

Currently, a conventional compression of a video signal can be performed by applying a two-dimensional low-pass filter to the chrominance components of the image signal. However, even though the quality of the image finally displayed on the screen remains acceptable, high-frequency information of the image signal can be lost.

The French patent application filed in the name of the applicant under the number 1650814 proposed a method and a device for encoding/decoding a multidimensional signal, leading advantageously to a compression/decompression of the multidimensional signal, making it possible to preserve the spectral performance levels throughout the frequency band of the signal (absence of linear filter) while not being significantly affected by a Gaussian white noise.

In the video domain, this encoding/decoding method and device result advantageously in compression/decompression, making it possible to reduce the visible degradations of the image displayed, and make it possible to significantly increase the compression rate to achieve, as a minimum for example, a compression rate of 3×.

This prior art encoding method is based on a localized encoding using a separation of the information conveyed by the signal, for example, the color information of the image, into a pair of components, namely a gradient amplitude and a structure (local coordinate system). The gradient amplitude/structure pairing is computed sample-by-sample (for example, pixel-by-pixel) by searching for the pair having the minimum error in a zone of available candidate samples, for example, a zone located in the vicinity of the current sample.

SUMMARY

Implementations and embodiments of the invention relate to the encoding, in particular embodiments to the compression, of digital data, for example, the encoding of a digital signal representing a multidimensional space, such as an image signal, and the dynamic control of the quality of this encoding so as, for example, to stabilize a characteristic associated with the encoded signal, such as the compression rate, on a target value, for example, a target compression rate. Other multidimensional signals can be envisaged such as, for example, multichannel audio signals.

According to one implementation and embodiment, an encoding method and device make it possible to dynamically control the quality of this encoding so as, for example, to stabilize a characteristic associated with the encoded signal, such as the compression rate, on a target value.

According to one aspect, there is proposed a method for encoding an initial digital signal, for example, an image signal, as an encoded signal. The initial digital signal comprises a sequence of samples, for example, pixels, representing a multidimensional space, for example, an image.

Each sample is assigned at least one physical quantity. In the case of an image signal, each pixel is assigned, for example, color components which form the physical quantities.

In the case of a multichannel audio signal, the physical quantities of each audio sample can be the sound levels of each of the channels.

In the case of a video application, the sequence of pixels can be a complete frame of the image or else a macroblock, for example, of 64×64 pixels, of the image, the macroblocks then arriving sequentially. The sequence of pixels can also be understood to be a succession of pixels of the frame of the image, these pixels arriving sequentially and line-by-line, in accordance with the "raster" format.

The method comprises, for at least some of the current samples, localized encodings of the signal as encoded local digital signals.

The encoded signal comprises the encoded local digital signals.

The method also comprises an on-the-fly analysis of a characteristic associated with the encoded signal, for example, the compression rate of the signal, and a direct or indirect adjustment at the sample level, of at least one encoding parameter involved in the localized encodings so as to stabilize the value of the characteristic on a target value, for example, a target compression rate, to within a tolerance.

Obviously, the tolerance value can be more or less low and is chosen as a function of the application envisaged and of the characteristic that is to be stabilized.

The compression rate is only a non-limiting example of a characteristic for which there is a desire to stabilize the value on a target value. It would also be possible to envisage stabilizing other characteristics, such as, for example, the stabilization of the noise level which represents an important challenge for most of the signals relating to a multidimensional space, such as, for example, an image signal or even a multichannel audio signal or even a signal comprising data relating to a weather map.

Thus, the combination of localized encodings, that is to say encodings performed at the "sample" (pixel for example) level with an on-the-fly analysis of a characteristic of the encoded signal makes it possible to perform an adjustment at the "sample" level so as to best stabilize the characteristic on its target value, and do so without requiring significant computation power, because simple local equations (at the sample level) are sufficient.

It then becomes possible to achieve image compression rates that can range up to 4.5× with 3×8 bit RGB formats, even 5× with 10-bit video signals.

As will be seen in more detail herein below, in some cases, the encoding parameter can be a bit whose value can be adjusted or forced indirectly via an intermediate parameter such as a threshold, for example, a threshold in a density matrix, whose value is, for its part, directly adjusted as a function of the result of the on-the-fly analysis.

In other cases, the encoding parameter can be another threshold, used, for example, to be compared to a gradient, which, for its part, will be directly adjusted as a function of the result of the on-the-fly analysis.

Although the on-the-fly analysis can be performed pixel-by-pixel, it can in practice, according to one implementation, be performed block-by-block. In other words, the on-the-fly analysis can comprise a determination of the value of the characteristic on a current block of samples of the sequence and the adjustment is then performed for each sample of the next block of samples.

According to a first possible implementation, a mask of the blue noise type can be applied to the sequence of samples.

In practice, this mask of the blue noise type can be a "dither" matrix of a threshold which thus offers a simple solution for controlling the density in a multidimensional context by using just one density parameter (the threshold) which is proportional to the desired overall density of any targeted quantity.

It is then possible to adjust a first encoding parameter and this adjustment comprises, for each current sample, a comparison of the value of the mask associated with this sample with a first threshold whose value is adjusted as a function of the value of the characteristic relative to the target value.

The result of the comparison conditions the value of this first encoding parameter.

The mask can be simply a static matrix (that is to say whose content is decorrelated from the content of the multidimensional space, for example, of the image) and comprising several values taken from a set of reference values.

Also, when the position of the sample corresponds to one of the values of the matrix, a first value is applied to the first threshold.

As an example, when the characteristic is the compression rate of the encoded signal, the value of the first encoding parameter defines the size of the encoded local digital signal.

Also, this first encoding parameter can be a reference bit which is forced to a first logic value when the value of the mask associated with the current sample is below or equal to the first threshold. In this case, the encoding can be forced to not perform local compression of the signal. In the case where the characteristic is the compression rate, this makes it possible to preserve a better image quality.

It would however be possible to force the reference bit to a first logic value when the value of the mask associated with the current sample is above the first threshold, which would favor the stability on a high compression rate, for example, but by accepting having an overall more degraded image quality.

Thus, in this implementation, it is the value of the first threshold which is correctly adjusted (for example increased or decreased) as a function of the on-the-fly analysis and it is the reference bit (which is a first encoding parameter) which is thereby indirectly adjusted via the first threshold.

And, it will be seen in detail herein below that, when the value of the mask associated with the current sample is above the first threshold, the value of this reference bit can then depend on a comparison between a gradient value of the physical quantity and a second threshold.

This second threshold can also be a second encoding parameter whose value will be able to be directly adjusted as a function of the result of the on-the-fly analysis.

The method according to this aspect is advantageously, but in a non-limiting manner, compatible with the encoding method described in the abovementioned French patent application.

In this respect, the localized encodings can be advantageously performed in local coordinate systems each including the current sample considered and two reference samples chosen, on the basis of a minimum gradient of the at least one physical quantity, from the available samples of the sequence.

The available samples of the sequence can be all or some of the samples already received, for example, samples having already arrived if a "raster" format is considered or else samples of the macroblock that has arrived and comprising the current sample. Moreover, these available samples may or may not have already undergone a localized encoding. These available samples may be samples neighboring or not neighboring the current sample or else samples further away from this sample.

The choice of the size of the zone containing the available samples results in particular from a trade-off between processing complexity and the accuracy desired for the encoded signal.

The gradient of a physical quantity assigned to a current sample is understood, for example, to be the variation of the level of this physical quantity seen at the level of this current sample, that is to say as the difference between the level of the physical quantity assigned to the current sample and the level of this same physical quantity assigned to another sample, for example, a sample neighboring this current sample.

In practice, the characteristics of the localized encoding of the signal are preferentially chosen for the number of bits of each encoded local digital signal to be less than the number of bits on which the level of the physical quantity considered is represented.

For example, if the physical quantities are represented by words of 10 to 16 bits, the characteristics of the localized encoding will preferentially be chosen so as to obtain a local encoded signal on a number of bits less than or equal to 9, even on a much lower number of bits.

Thus, the localized encoding then results in a localized compression.

That said, it is possible for, in certain applications, for example, for physical quantities represented by words of 8 bits, the localized encoding to lead, for certain samples, to a local digital signal encoded on a number of bits greater than 8, for example, 9 bits. However, it is found that, for other samples, the local signal can be encoded on a much lower number of bits, for example, 3 bits, thus nevertheless resulting overall for the global encoded signal in a compressed signal.

Each localized encoding advantageously comprises, for each physical quantity assigned to the current sample considered, a digital parameterization of the local coordinate system and of the level of the physical quantity considered in the local coordinate system so as to obtain the local encoded signal associated with the current sample and with the physical quantity considered.

The parameterization of the local coordinate system can comprise the creation of a group of first bits whose values define the structure of the local coordinate system out of a set of possible structures.

Thus, when the reference bit is forced to its first logic value, the encoded local digital signal can then contain only the group of first bits and the reference bit.

As indicated above, it is possible to use, as other encoding parameter, another threshold involved in a comparison operation with a gradient parameter.

More specifically, according to this other implementation, the parameterization of the level of the physical quantity considered in the local coordinate system comprises a creation of a parameter here called gradient parameter, involving at least the absolute value of the gradient, called first gradient, of the physical quantity between the current sample and a first reference sample, a comparison of this gradient parameter to a second threshold, and a creation of a comparison bit representative of the result of the comparison.

This second threshold is the second encoding parameter.

This gradient parameter can be, for example, the absolute value of the first gradient itself or else a standardized gradient.

The use of a standardized gradient provides greater accuracy and a better image quality but could require a division to be performed within the encoder. The use of the absolute value of only the first gradient is simpler to implement and proves sufficient in most applications.

The second threshold will thus advantageously be able to be adjusted as a function of the trend of the compression rate during the encoding relative to the target compression rate.

It is also possible for the parameterization of the level of the physical quantity considered in the local coordinate system to comprise a determination of a polarity bit whose value indicates at least the positioning of the level of the physical quantity considered assigned to the current sample relative to the level of the physical quantity assigned to the first reference sample.

Also, if the gradient parameter is below or equal to this second threshold, the encoded local digital signal can then contain only the group of first bits and the comparison bit, whereas, if the gradient parameter is above this second threshold, the encoded local digital signal then contains the group of first bits, possibly the compressed gradient parameter, the polarity bit and the comparison bit.

In order to further enhance the quality of the control of the encoding, it is possible to combine the two implementations indicated previously, that is to say act jointly on the first threshold and the second threshold mentioned above.

In other words, the comparison bit is then the reference bit. Whereas it has been seen above that the reference bit could be forced to a first logic value when the value of the mask associated with the current sample is below or equal to the first threshold (which can correspond to forcing the encoding to not perform any local compression of the signal), the value of this comparison bit (reference bit) can depend on the result of the comparison between the gradient parameter and the second threshold if the value of the mask associated with the current sample is above the first threshold.

So as also to enhance the dynamic control of the encoding, it is possible to take account of a cumulative quantization error and adjust certain parameters so as to obtain a lower cumulative error.

In other words, according to another implementation, the parameterization of the level of the physical quantity considered in the local coordinate system further comprises a compressive encoding over a group of second bits of the gradient parameter so as to obtain a compressed gradient parameter and the parameterization of the level of the physical quantity considered in the local coordinate system further comprises, for the first sample of the sequence, a) a creation, from the compressed gradient parameter, of a first compressed complementary digital word and of a second compressed complementary digital word framing the compressed gradient parameter, b) a decompressive decoding of the first compressed complementary digital word, a reconstruction of the level of the physical quantity from the first decoded complementary digital word so as to obtain a first reconstructed level for the physical quantity, c) a creation of a first error between the physical quantity level considered and the first reconstructed level, d) a decompressive decoding of the second compressed digital word, e) a reconstruction of the level of the physical quantity from the second decoded complementary digital word so as to obtain a second reconstructed level for the physical quantity, f) a creation of a second error between the physical quantity level considered and the second reconstructed level, g) a selection of that of the first or of the second compressed complementary digital word which gives the lowest error out of the first error and the second error, and for each next sample, h) a repetition of the steps a) to f), a creation of a first cumulative error equal to the sum of the first error and of all the lowest errors associated with the preceding samples, a creation of a second cumulative error equal to the sum of the second error and of all the lowest errors associated with the preceding samples, a selection of that of the first or of the second compressed complementary digital word which gives the lowest error out of the first cumulative error and the second cumulative error, and if the gradient parameter is below or equal to the second threshold, it is then considered to be nil, and the encoded local digital signal then contains only the group of first bits and the comparison bit, whereas, if the gradient parameter is above the second threshold, the encoded local digital signal then contains the group of first bits, the selected compressed complementary digital word, the polarity bit and the comparison bit.

It is also possible, in another implementation, and still in order to enhance the control of the encoding, to classify each sample of the sequence in a class belonging to a set of classes and directly or indirectly adjust, in each class separately, at least one encoding parameter, for example, the value of the first threshold, as a function of the class involved in the localized encodings so as to stabilize the value of the characteristic on the target value, for example, a target compression rate, to within a tolerance.

Thus, by way of example, the set of classes comprises a first class associated with the samples belonging to a zone in which the gradients of the at least one physical quantity are uniform, a second class associated with the samples in which the gradients of the at least one physical quantity are local extrema (local minima or maxima) and, a third class associated with the samples belonging to at least one outline of the multidimensional space, for example, an outline of the image.

It should be noted here that the density of samples of the second class contributes to determining the noise level of the encoded signal which can then, for example, be stabilized on a target value by adjusting the value of the first threshold.

Obviously, the different embodiments which have just been considered to enhance the quality of the control of the encoding can be used separately or, for at least some of them, in combination.

Moreover, when the localized encoding conforms to that described in the French patent application mentioned previously, it can advantageously comprise the following characteristics which can be used in all the implementations described previously.

More specifically, each localized encoding can comprise, for each physical quantity assigned to the current sample considered, a determination of the local coordinate system formed by the current sample and the two reference samples selected at least from a determination of the gradient having the lowest absolute value out of the gradients of the physical quantity considered between the current sample and at least two available samples, for example, two samples neighboring this current sample.

The first reference sample of the local coordinate system can be selected at least from the determination of the gradient having the lowest absolute value out of the gradients of the physical quantity considered, and the second reference sample is a remaining available sample forming, with the first reference sample and the current sample, a right angle, or a remaining available sample selected at least from the determination of the gradient having the lowest absolute value out of the gradients of the physical quantity considered.

When each sample is assigned several physical quantities, as is the case, for example, for a pixel assigned several color components, it is possible to determine a local coordinate system for each physical quantity associated with this current sample.

That said, in practice, it is preferable, for reasons of simplicity, to determine, for each current sample, a single local coordinate system valid for all the physical quantities assigned to this current sample.

The determination of the local coordinate system can comprise, for each current sample belonging to a group of at least three samples including the current sample and at least two available samples, for example, two samples neighboring this current sample, a first determination step comprising, for each physical quantity, a determination of the gradients of this physical quantity between the current sample and each available sample, a step of selection of the first reference sample comprising a selection, from the available samples, of the available sample whose associated gradient has the lowest absolute value out of all the gradients computed for all the physical quantities, a second step of determination of the second reference sample comprising a determination, from the remaining available samples, of the available sample forming, with the first reference sample and the current sample, a right angle or corresponding to the available sample whose associated gradient has the greatest absolute value out of all the gradients computed for all the physical quantities.

According to an advantageous implementation, particularly well-suited to a "raster scan", for each current sample, the group includes the current sample and four neighboring samples having already given rise to the establishment of the encoded local digital signals associated with these neighboring samples, and the second reference sample is that which forms a right angle with the first reference sample and the current sample.

Moreover, the parameterization of the level of the physical quantity considered in the local coordinate system can further advantageously comprise a compressive encoding on a group of second bits of the gradient parameter so as to obtain the compressed gradient parameter.

According to a possible variant, the polarity bit indicates whether the level of the physical quantity considered assigned to the current sample is or is not situated between the level of the physical quantity assigned to the first reference sample and the level of the physical quantity assigned to the second reference sample, and the parameterization of the level of the physical quantity considered in the local coordinate system further comprises a determination of the absolute value of the gradient, called second gradient, of the physical quantity between the current sample and the second reference sample, a determination of a normalized gradient from absolute values of the first gradient and of the second gradient, the normalized gradient forming the gradient parameter.

So as to allow for an error diffusion, the parameterization of the level of the physical quantity considered in the local coordinate system can further advantageously comprise an addition of a pseudo-random quantity to the parameter or to the compressed parameter.

In some cases, the sequence of samples can be subdivided into a plurality of subsequences. Such is, for example, the case when the signal is a video signal coded in $YC_bC_r$ format 420. The first subsequence can then comprise the samples assigned the components $YC_bC_r$. The second subsequence can be composed of the samples situated between the samples of the first subsequence and the third subsequence can be composed of the samples assigned the component Y and surrounded by the samples of the second subsequence.

It is then possible to perform localized compressions in parallel or sequentially on each of these subsequences.

So as to obtain another constant tolerance in local encodings, it may be advantageous for the initial signal on which these localized encodings are performed to result from a preprocessing performed on a basic signal, this preprocessing comprising, for example, a pre-emphasis processing.

According to another aspect, there is proposed a method for decoding a digital signal as a decoded signal, the digital signal having been encoded by the encoding method as defined above, the decoding method comprising, for each current sample and for each physical quantity, a creation of the level of the physical quantity considered from the encoded local digital signal associated with this current sample, so as to deliver a decoded local signal, the decoded signal comprising the decoded local signals.

When the initial digital signal has been encoded following a pre-emphasis processing, it is advantageous to perform a post-processing on the decoded signal, this post-processing comprising a de-emphasis processing.

According to another aspect, there is proposed a device for encoding an initial digital signal as an encoded signal, the initial digital signal comprising a sequence of samples representing a multidimensional space, each sample being assigned at least one physical quantity, comprising a processor configured to perform, for at least some of the current samples, localized encodings of the signal as encoded local digital signals, the encoded signal comprising the encoded local digital signals, an on-the-fly analysis of a characteristic associated with the encoded signal, and a direct or indirect adjustment at the sample level, of at least one encoding parameter involved in the localized encodings so as to stabilize the value of the characteristic on a target value to within a tolerance.

According to one embodiment, the processor is configured to perform the on-the-fly analysis comprising a determination of the value of the characteristic on a current block of samples of the sequence and to perform the adjustment for each sample of the next block of samples.

According to one embodiment, the processor is configured to apply a mask to the sequence of samples, and to perform the adjustment of a first encoding parameter comprising, for each current sample, a comparison of the value of the mask associated with this sample with a first threshold whose value is adjusted as a function of the value of the characteristic relative to the target value, the result of the comparison conditioning the value of the first encoding parameter.

The mask can be of the blue noise type or a static matrix comprising a plurality of values taken from a set of reference values.

The characteristic can be the compression rate of the encoded signal and the value of the first encoding parameter defines the size of the encoded local digital signal.

According to one embodiment, the first encoding parameter is a reference bit, and the processor is configured to force the reference bit to a first logic value when the value of the mask associated with the current sample is below or equal to the first threshold.

According to one embodiment, the processor is configured to perform the localized encodings in local coordinate systems each including the current sample considered and two reference samples chosen, on the basis of a minimum gradient of the at least one physical quantity, from the available samples of the sequence, and to perform, for each physical quantity assigned to the current sample considered, a digital parameterization of the local coordinate system and of the level of the physical quantity considered in the local coordinate system so as to obtain the local encoded signal associated with the current sample and with the physical quantity considered.

According to one embodiment, the processor is configured to perform, for the parameterization of the local coordinate system, a creation of a group of first bits whose values define the structure of the local coordinate system out of a set of possible structures.

When the reference bit is forced to its first logic value, the encoded local digital signal then contains only the group of first bits and the reference bit.

According to one embodiment, the processor is configured to perform, for the parameterization of the level of the physical quantity considered in the local coordinate system, a creation of a gradient parameter involving at least the absolute value of the gradient, called first gradient, of the physical quantity between the current sample and a first reference sample, a comparison of this gradient parameter to a second threshold, and a creation of a comparison bit representative of the result of the comparison, and in which the second threshold is a second encoding parameter.

This comparison bit can be the reference bit mentioned above.

According to one embodiment, the processor is configured to perform, for the parameterization of the level of the physical quantity considered in the local coordinate system, a determination of a polarity bit whose value indicates at least the positioning of the level of the physical quantity considered assigned to the current sample relative to the level of the physical quantity assigned to the first reference sample.

According to one embodiment, if the gradient parameter is below or equal to the second threshold, the encoded local digital signal then contains only the group of first bits and the comparison bit, and if the gradient parameter is above the second threshold, the encoded local digital signal then contains the group of first bits, possibly the compressed gradient parameter, the polarity bit and the comparison bit.

According to one embodiment, the processor is configured to perform, for the parameterization of the level of the physical quantity considered in the local coordinate system, a compressive encoding over a group of second bits of the gradient parameter so as obtain a compressed gradient parameter and to perform, for the parameterization of the level of the physical quantity considered in the local coordinate system, for the first sample of the sequence, a) a creation, from the compressed gradient parameter, of a first compressed complementary digital word and of a second compressed complementary digital word framing the compressed gradient parameter, b) a decompressive decoding of the first compressed complementary digital word, a reconstruction of the level of the physical quantity from the first decoded complementary digital word so as to obtain a first reconstructed level for the physical quantity, c) a creation of a first error between the physical quantity level considered and the first reconstructed level, d) a decompressive decoding of the second compressed digital word, e) a reconstruction of the level of the physical quantity from the second decoded complementary digital word so as to obtain a second reconstructed level for the physical quantity, f) a creation of a second error between the physical quantity level considered and the second reconstructed level, g) a selection of that of the first or of the second compressed complementary digital word which gives the lowest error out of the first error and the second error, and for each next sample, h) a repetition of the steps a) to f), a creation of a first cumulative error equal to the sum of the first error and of all the lowest errors associated with the preceding samples, a creation of a second cumulative error equal to the sum of the second error and of all the lowest errors associated with the preceding samples, a selection of that of the first or of the second compressed complementary digital word which gives the lowest error out of the first cumulative error and the second cumulative error, and if the gradient parameter is below or equal to the second threshold, it is then considered to be nil, and the encoded local digital signal then contains only the group of first bits and the comparison bit, whereas, if the gradient parameter is above the second threshold, the encoded local digital signal then contains the group of first bits, the compressed complementary digital word selected, the polarity bit and the comparison bit (or reference bit).

According to one embodiment, each sample of the sequence is classified in a class belonging to a set of classes and the processor is configured to adjust, directly or indirectly in each class separately, at least one encoding parameter involved in the localized encodings so as to stabilize the value of the characteristic on the target value, for example, a target compression rate, to within a tolerance.

According to one embodiment, the initial digital signal is a video signal, each sample being a pixel and each physical quantity is a color component of the pixel.

According to another aspect, there is proposed a device for decoding a digital signal encoded by the encoding device as defined above, configured to deliver a decoded signal, comprising a processor configured to, for each current sample, perform a creation of the level of the physical quantity considered from the encoded local digital signal associated with this current sample, so as to deliver a decoded local signal, the decoded signal comprising the decoded local signals.

According to another aspect, there is proposed a computer program product that can be loaded directly into a memory of a computer system, comprising software code portions for the execution of the encoding method as defined above or of the decoding method as defined above, when the program is run on the computer system.

According to another aspect, there is proposed a medium that can be read by a computer system, having instructions that can be executed by computer suitable for provoking the execution by the computer system of the encoding method as defined above or of the decoding method as defined above.

BRIEF DESCRIPTION OF THE DRAWINGS

Other advantages and features of the invention will become apparent on studying the detailed description of non-limiting implementations and embodiments, and the drawings in which FIGS. 1 to 27 schematically illustrate different implementations and embodiments of the methods and devices according to the invention.

DETAILED DESCRIPTION OF ILLUSTRATIVE EMBODIMENTS

Figure 1:
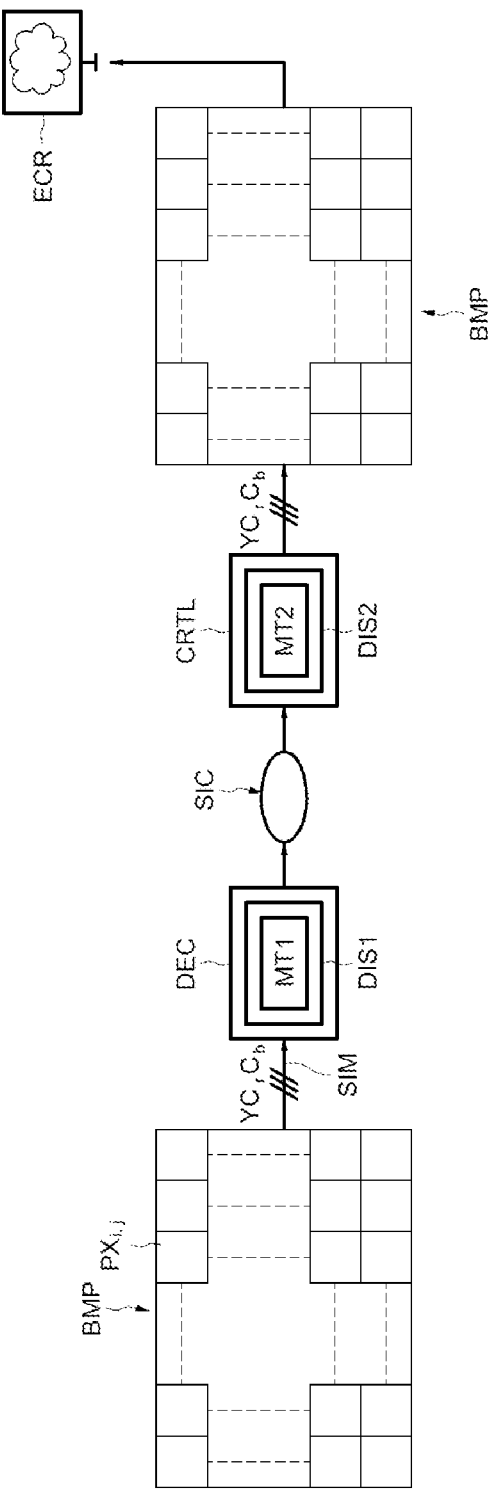

In FIG. 1, the reference DIS1 denotes a device for encoding an image signal. The device DIS1 can be incorporated in a video decoder DEC, for example, a TV decoder conforming to the MPEG standards.

The device DIS1 receives an initial image signal SIM comprising a sequence BMP of pixels $PX_{ij}$.

Each pixel is assigned several digital color components, here three color components, namely a luminance component Y, a chrominance component Cr and another chrominance component Cb.

The sequence BMP of pixels can be a complete frame of the image stored, for example, in a video memory. As a variant, the pixels of the frame of the image can be delivered sequentially one-by-one and line-by-line ("raster" format). The pixels of the sequence can also be delivered macroblock-by-macroblock. In this case, the macroblocks are stored in a video memory then processed by the device DIS1. When the pixels arrive sequentially, in a format of the raster type, they are also stored, for example, in a video memory, so as to be subsequently processed by the device DIS1.

The device DIS1 comprises a processor MT1 for processing the image signal SIM and delivering, for each color component, an encoded image signal SIC. This encoded image signal is in practice a compressed image signal.

This signal SIC is then delivered via, for example, a wired link, to a screen controller CTRL comprising a decoding device DIS2. The signal SIC is processed by processor MT2 which reconstitute the sequence BMP of pixels assigned the three color components Y, Cr, Cb in order to display the image on a screen ECR, for example, a screen of a high definition television.

The processor MT1 and MT2 can be produced, for example, by specific integrated circuits (ASIC) or else by software modules in processors, these software modules being able to be stored in program memories, for example, of the read-only memory type (ROM, EEPROM, etc.).

Figure 2:
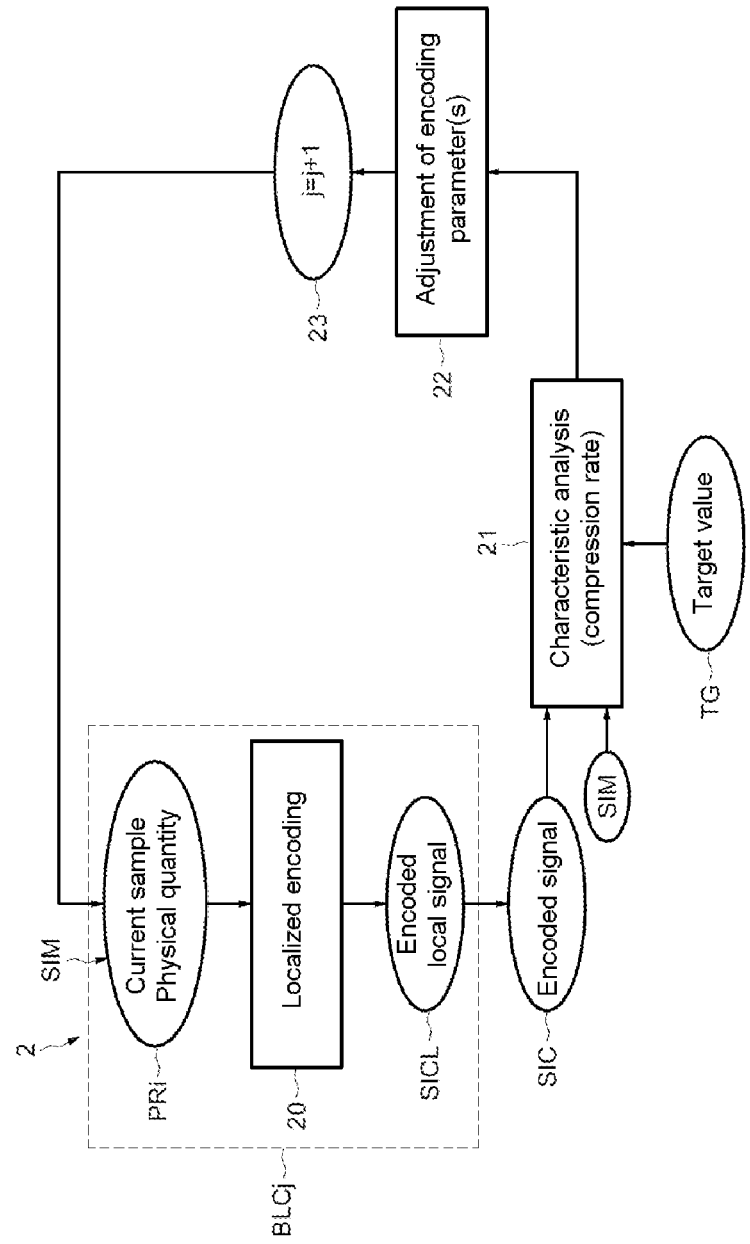

There now follows a more detailed description, referring more particularly to FIG. 2 and subsequent figures, exemplary implementations of the method for encoding the image signal SIM according to the invention implemented by the processor MT1 of the encoding device DIS1 incorporated, for example, in the MPEG decoder DEC.

Generally, as illustrated in FIG. 2, the encoding method 2 comprises, for at least some of the current samples PRi of a current block BLCj of the image signal SIM, and for each physical quantity assigned to this current sample, a localized encoding 20 of the signal.

There is then obtained, for this physical quantity and for the sample considered, an encoded local digital signal SICL. The set of the encoded local signals SICL associated with the physical quantity considered forms the encoded image signal SIC associated with the physical quantity considered.

There is then (step 21) an on-the-fly analysis of a characteristic associated with the encoded signal SIC, for example, the compression rate of this encoded signal.

This compression rate is typically the ratio between the number of bits of the encoded signal SIC and the number of bits of the initial signal SIM. In the example described here, this on-the-fly analysis 21 comprises a determination of the value of the characteristic (compression rate for example) on the current block BLCj of samples of the sequence of samples.

The size of this current block can, for example, be of the order of 1000 to several thousands of samples.

There is then an adjustment 22, direct or indirect, of at least one encoding parameter involved in the localized encodings so as to stabilize the value of the characteristic (the compression rate for example) on a target value TG (a target compression rate) to within a tolerance.

Also, although the on-the-fly analysis has been done here on current block BLCj of samples, the adjustment 22 is performed for each sample of the next block of samples BLCj+1 (step 23).

As will be seen in more detail herein below, this adjustment can be direct or indirect.

In other words, it is possible in some cases for the adjustment of an encoding parameter (typically a bit whose logic value will, for example, indicate that no compression is performed) to depend on a first threshold which will itself be directly adjusted as a function of the result of the analysis.

In this case, the encoding parameter is indirectly adjusted via an intermediate parameter, (in this case the first threshold), which is itself directly adjusted so as to stabilize the value of the characteristic (the compression rate) on the target value TG.

In other cases, the encoding parameter can also be a second threshold which, for its part, will be able to be adjusted directly so as to stabilize the value of the compression rate on the target value TG.

Before returning in more detail to examples of encoding parameters which will be able to be adjusted so as to stabilize the value of the compression rate on the target value, there now follows a more detailed description of a particular example of localized encoding of the type of that described in the French patent application mentioned above, although the invention is not limited to this type of localized encoding.

Figure 3:
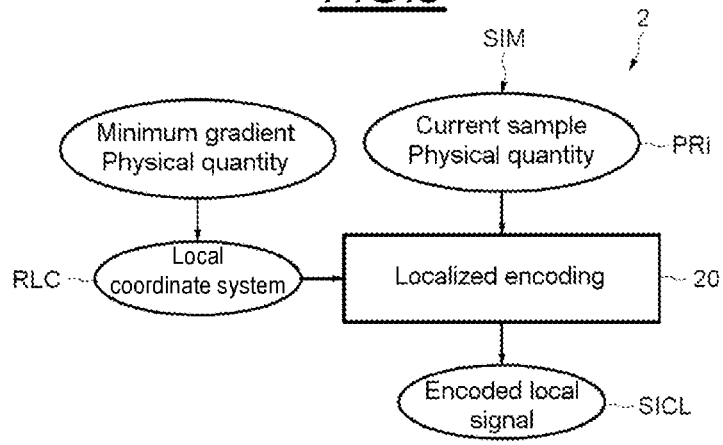

More specifically, the localized encodings are performed (FIG. 3) in local coordinate systems RLC each including the current sample considered and two reference samples chosen, on the basis of a minimum gradient of the at least one physical quantity, from the available samples of the sequence, for example, in the vicinity of the current sample.

Also, each localized encoding 20 comprises, for each physical quantity assigned to the current sample considered, a digital parameterization of the local coordinate system RLC and of the level of the physical quantity considered in the local coordinate system so as to obtain the local encoded signal SICL associated with the current sample and with the physical quantity considered.

Figure 4:
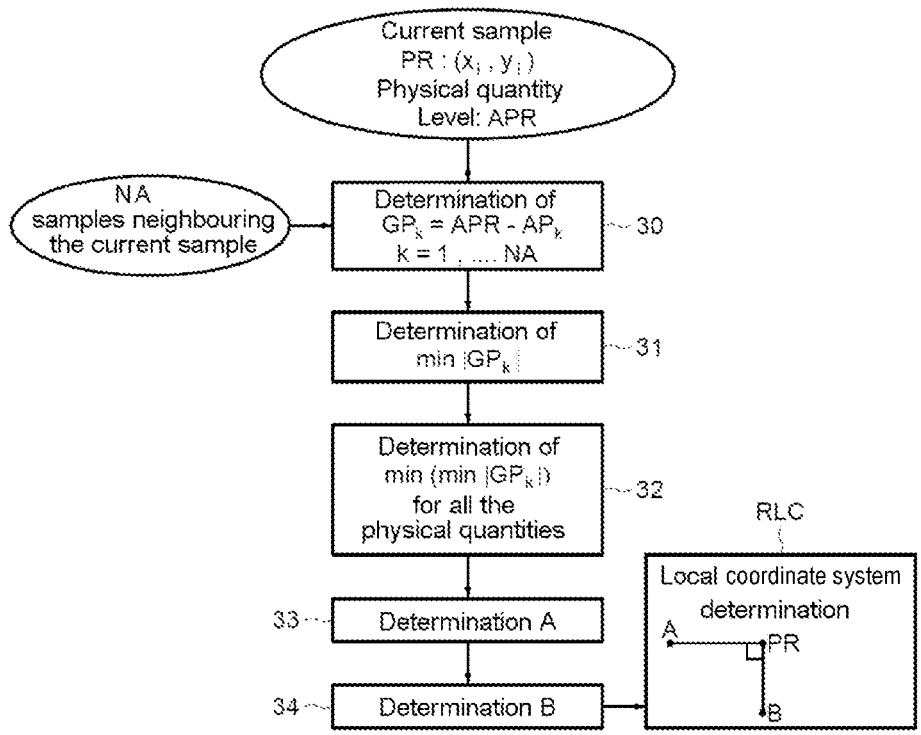

Reference is now made more particularly to FIG. 4 to illustrate an implementation that makes it possible to determine, for the current sample (pixel) considered PR, the local coordinate system RLC.

NA available samples of the sequence, that are assumed in this example to be NA samples neighboring the current sample, NA being at least equal to 2, are selected. Then there is a determination, in step 30, for the physical quantity considered having the level (amplitude) APR for the pixel PR, of the gradient GPk of the physical quantity considered between the current sample PR and the neighboring sample whose physical quantity has the level APk.

More specifically, GPk is equal to the difference between APR and APk.

After having performed this determination for each of the NA samples neighboring the current sample, in the step 31, the gradient having the lowest absolute value out of the set of the gradients previously computed GPk is determined.

Then, these operations are repeated for all the physical quantities assigned to the current sample and, in the step 32, the gradient having the lowest absolute value out of the set of the gradients determined for all neighboring samples and all the physical quantities is determined.

The neighboring sample to which this minimum gradient is assigned is then designated as being a first reference sample A (step 33).

Then, a second reference sample B is determined, which, in the present case, is the remaining neighboring sample forming, with the sample A and the current sample PR, a right angle.

The reference sample PR and the two reference samples A and B together form the local coordinate system RLC associated with the current sample PR.

Possible examples of local coordinate systems will now be illustrated by referring more particularly to FIGS. 5 to 9.

Figure 5:
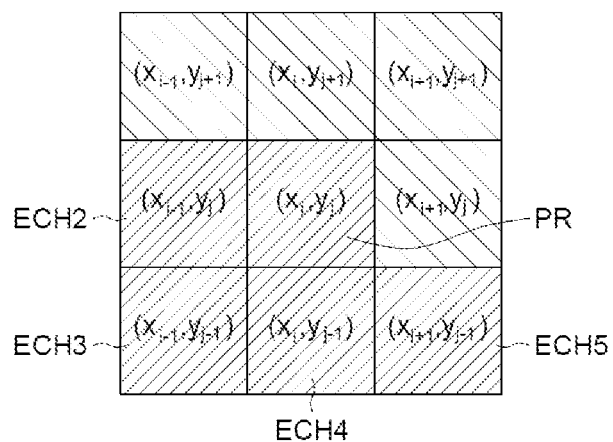

In FIG. 5, it is assumed that the pixels arrive sequentially in a format of the "raster" type.

It is also assumed in FIG. 5 that the current pixel (sample) PR of coordinates $x_i$ and $y_j$ is currently being processed and that the preceding pixels ECH2, ECH3, ECH4 and ECH5 have already been processed by the encoding method.

By contrast, the other pixels, that is to say the pixel of coordinates $x_{i+1}, y_j$ belonging to the line j and the pixels belonging to the line j−1 have not yet been processed.

Consequently, the samples neighboring the pixel PR, from which the first reference sample A and the second reference sample B will be determined, are the pixels ECH2, ECH3, ECH4 and ECH5.

This determined local coordinate system RLC will, in this example, be the single local coordinate system associated with the current sample PR and valid for the encoding of all the physical quantities, that is to say, here, all the color components, of the current sample.

Figure 6:
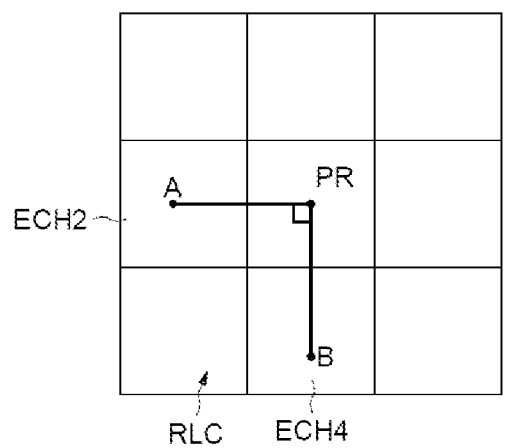

Thus, in FIG. 6, the first reference sample A is the sample ECH2 and the second reference sample B is the sample ECH4.

Figure 7:
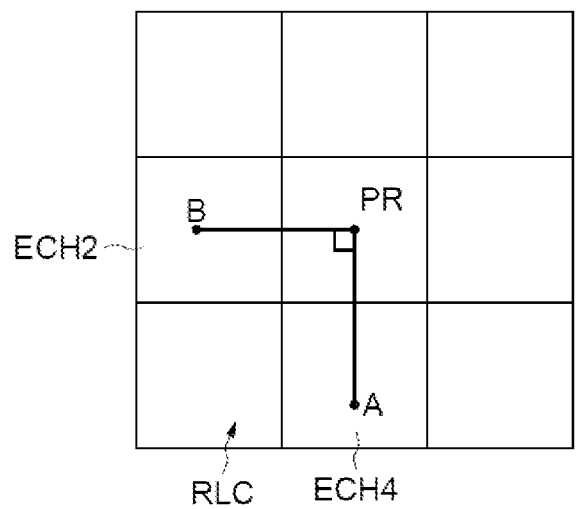

Another possible configuration is illustrated in FIG. 7, in which the first reference sample A is, this time, the sample ECH4 whereas the second reference sample B is, this time, the sample ECH2.

Figure 8:
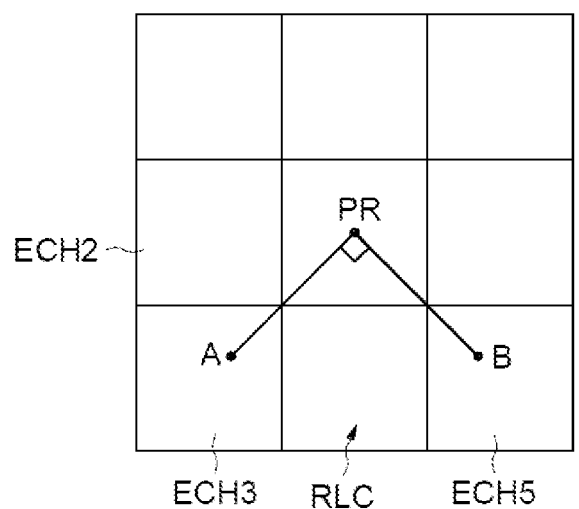

It is also possible, as illustrated in FIG. 8, to have another structure for the local coordinate system RLC. In this structure, the first reference sample A is the sample ECH3 and the second reference sample B is the sample ECH5.

Figures 9, 10:
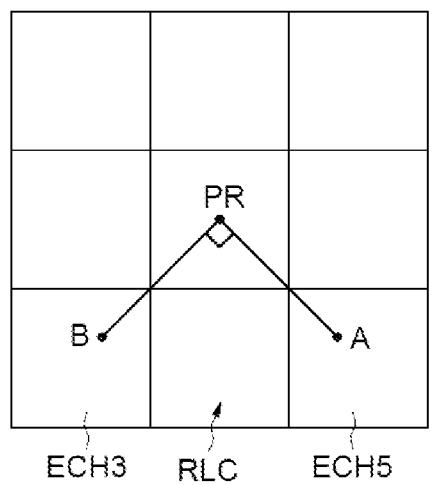

In the structure illustrated in FIG. 9, the first reference sample A is the sample ECH5 and the second reference sample B is the sample ECH3.

It can therefore be seen that it is possible to define a group of first bits that make it possible to parameterize the structure of the local coordinate system.

In the example described here and as illustrated in FIG. 10, the group of first bits STRC comprises two bits that make it possible to parameterize the four possible positions of the first reference sample A and consequently the four possible structures of the local coordinate system RLC.

Thus, in the example described here, if the first reference sample A is the sample ECH2, then the two bits STRC respectively have the values 00.

If the reference sample A is the sample ECH3, then the two bits STRC have the values 01.

If the first reference sample A is the sample ECH4, then the two bits STRC have the values 1 and 0 whereas, if the first sample A is positioned at the level of the sample ECH5, then the two bits STRC have the values 1 and 1.

As illustrated in FIG. ii, other local coordinate system structures are possible, not necessarily providing a right angle between the two lines respectively linking the current sample to the two reference samples. That said, although the first reference sample A always remains the one which is associated with the gradient having the lowest absolute value, the second reference sample B is either a sample forming, with the current sample and the first reference sample, a right angle, or the sample neighboring the current sample associated with the greatest absolute value of all gradients computed.

Moreover, such local coordinate systems can also be used, for example, when processing the image not in a "raster" format, but, for example, macroblock-by-macroblock.

In the examples which have just been described, the candidate samples used for the determination of the reference samples A and B were samples neighboring the current sample PR.

That said, other available candidate samples are possible and can be more distant from the current sample PR.

Such is the case in the examples illustrated in FIGS. 12 and 13.

In FIG. 12, in addition to the samples ECH2-ECH5, it is also possible to take into account, for the determination of the reference samples A and B, the sample ECH6.

In FIG. 13, in addition to the samples ECH2-ECH5, it is also possible to take into account, for the determination of the reference samples A and B, the samples ECH0, ECH1 and ECH6.

Obviously, depending on the number of samples taken into account and therefore on the number of possible structures, the group of first bits STRC can comprise more than 2 bits.

With the parameterization of the local coordinate system having been performed, the processor MT1 is configured to parameterize, in this local coordinate system, the level APR of the physical quantity considered.

Figure 14:
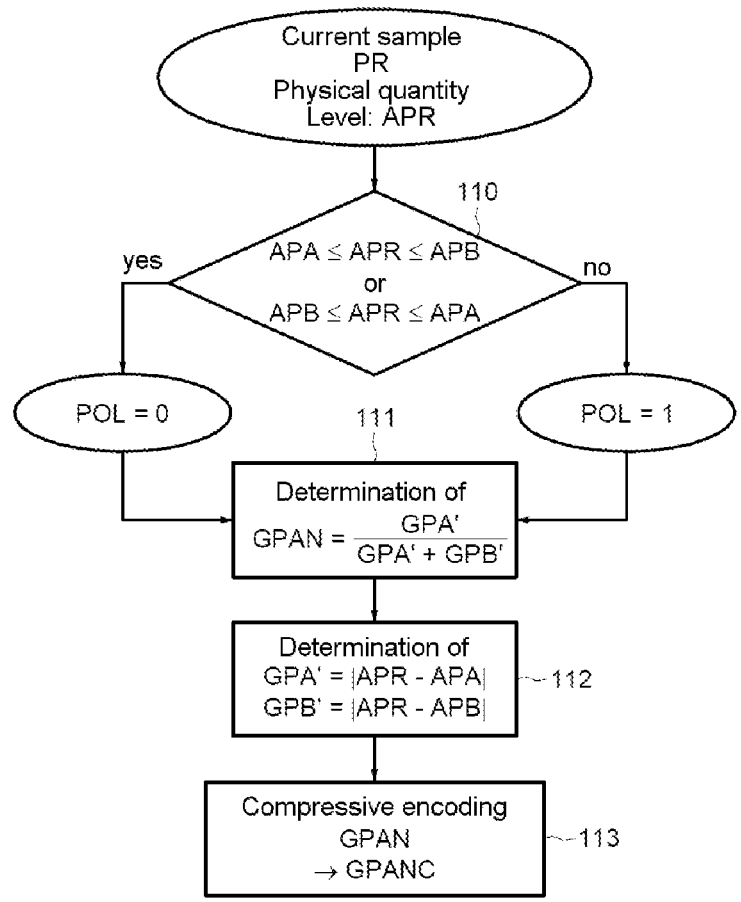

A first possible variant is illustrated in particular in FIG. 14.

In the step 110, the processor MT1 verifies whether the level of the physical quantity APR is situated between the level APA of the physical quantity associated with the first reference sample A and between the level APB of the physical quantity assigned to the second reference sample B, or else between APB and APA.

If such is the case, this is a case of interpolation and the processor assigned, for example, the logic value 0 to a polarity bit POL.

Otherwise, this is an extrapolation case, that is to say that the level APR is either above or equal to the level APA which is itself above or equal to the level APB. In this case, the processor confers the value 1 on the polarity bit POL.

It should be noted that, in the extrapolation case, if the level APR is greater than the levels APA and APB, the level APB cannot be above the level APA because the first reference sample A is that for which there is the minimum gradient.

Similarly, in the case where the level APR is lower than the two levels APA and APB, the level APA cannot be above the level APB for the same reason (minimum gradient for the first reference sample A).

A particularly simple way of determining whether the case is one of interpolation or of extrapolation consists in determining the product of the sign of the gradient GPA equal to APR-APA by the sign of the gradient GPB equal to APR-APB.

If the sign of this product is positive, then the polarity bit POL is set to 1 (extrapolation) whereas, if the sign of the product is negative, then the polarity bit POL is set to zero (interpolation).

Figure 15:
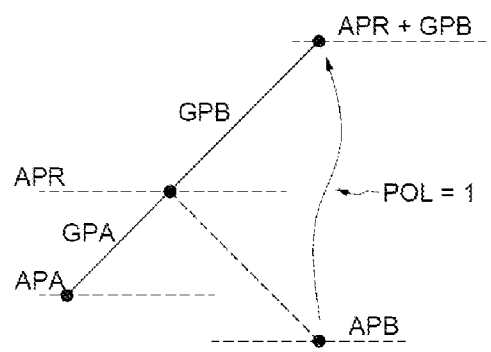

As illustrated in FIG. 15, in the case of an extrapolation situation, an interpolation situation is restored by converting the amplitude APB into an amplitude equal to APR+GPB, which is an operation that is reversible at the decompression level, that is to say that upon the reconstruction of the level APR, by taking into account the polarity bit POL.

In the step 111, the processor MT1 determines the value GPA' equal to the absolute value of GPA (GPA'=APR-APA) and the value GPB' equal to the absolute value of GPB (GPB'=APR-APB).

Then, the processor MT1 determines a gradient parameter which, in this exemplary implementation, is a normalized gradient, from GPA' and GPB'.

This normalized gradient GPAN is equal to GPA'/(GPA'+GPB').

Moreover, since a normalization has been performed extending between the values 0 and 1, the normalized gradient GPAN is also equal to 1−(GPW/(GPA'+GB')), to within an error.

Then, the processor performs, in step 113, a compressive encoding of the normalized gradient GPAN so as to obtain a compressed normalized gradient GPANC on a group of second bits. As an indication, if the normalized gradient GPAN is coded on ten bits, provision can be made to code the compressed normalized gradient GPANC on five bits.

The compression is performed in a conventional way and in a way that is known per se using a compression curve.

Figure 16:
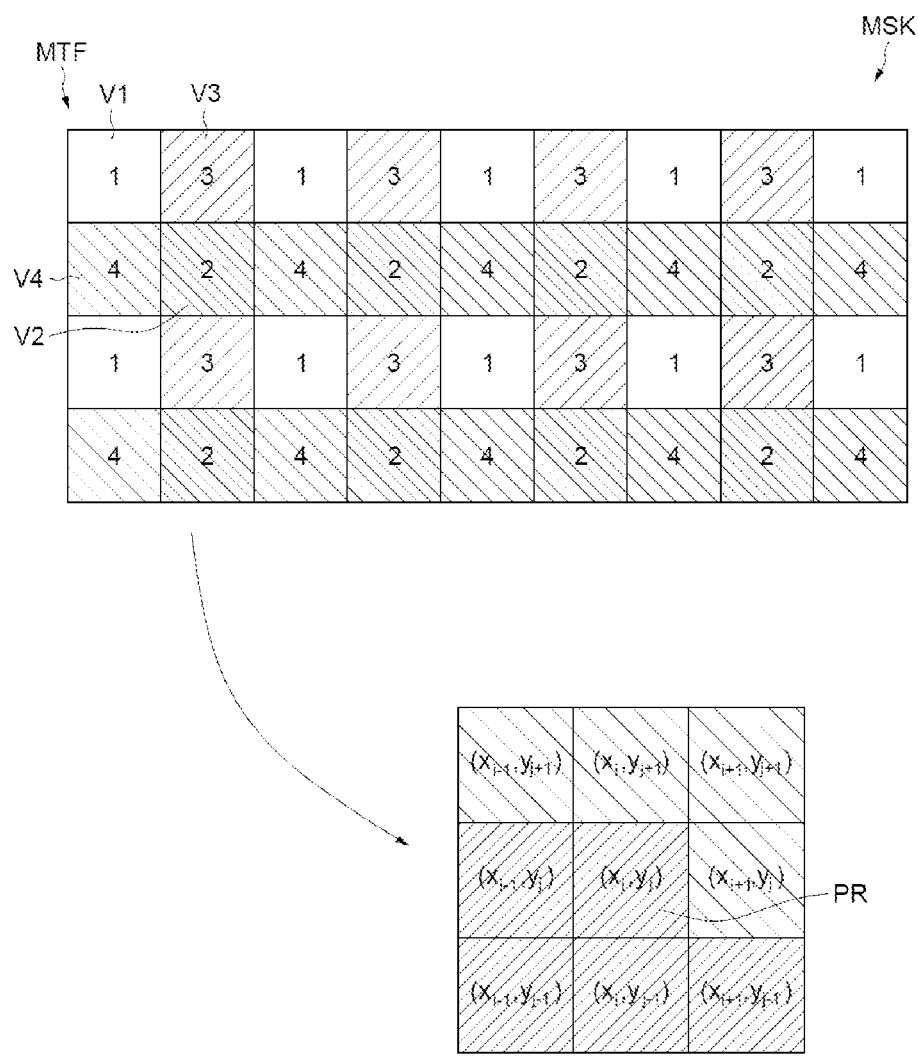
Figure 17:
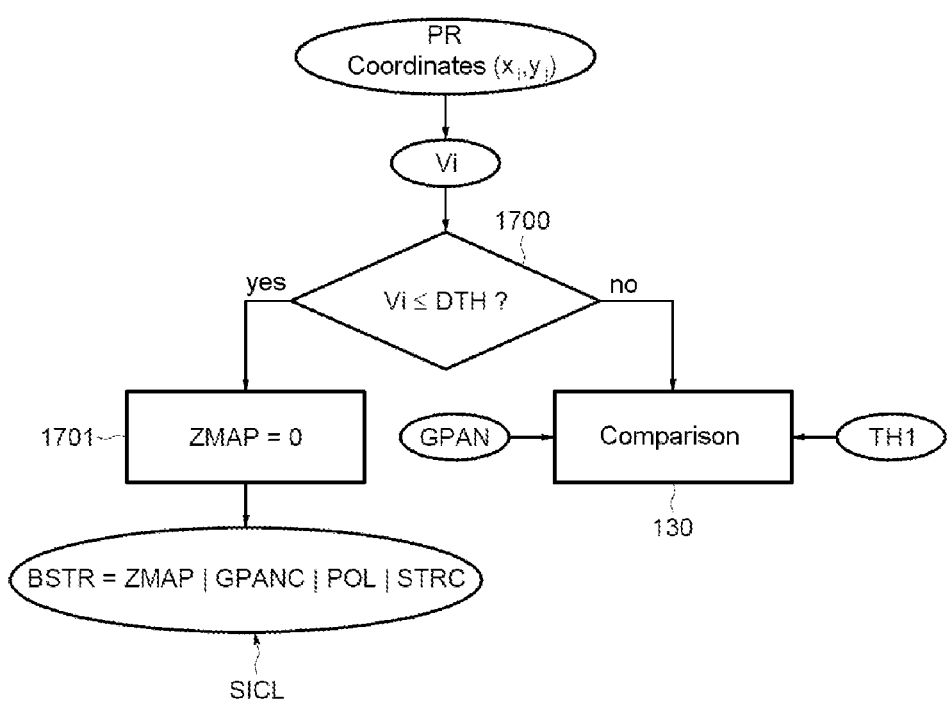

Reference is now made more particularly to FIGS. 16 and 17 to illustrate an adjustment of a first encoding parameter contributing to stabilizing the compression rate on a target compression rate.

As will be seen herein below, this first encoding parameter is a reference bit ZMAP (FIG. 17) which will be adjusted indirectly via an intermediate parameter which is a first threshold DTH which will be adjusted directly as a function of the deviation between the current value of the compression rate evaluated on the current block of pixels relative to the target value TG of this compression rate.

As illustrated in FIG. 16, a mask MSK is applied to the sequence of samples.

Generally, this mask MSK is a mask of the blue noise type which can be like a matrix. Such a matrix is a so-called "dither" matrix which makes it possible to modulate the density of samples which will be situated under a certain threshold. Also, this first threshold DTH will make it possible to have a maximum correction rate while influencing the perceptual quality of the image.

A person skilled in the art knows how to create masks of the blue noise type. In this respect, reference will, for example, can be made to the article by J. Bacca Rodriguez and others entitled "Blue-noise Multitone Dithering," IEEE Transactions on Image Processing, Vol. 17, No. 8, August 2008.

That said, the use as mask MSK, of a static matrix (that is to say established with no knowledge of the content of the multidimensional space, in this case of the content of the image, and therefore sufficiently decorrelated from the content of the multidimensional space) can be sufficient in certain applications.

As illustrated in FIG. 16, this static matrix MSK here comprises a repetitive pattern MTF of four values V1-V4 taken from a set of reference values V1-V4. In the example described here, the values V1-V4 are respectively 1-4.

Obviously, the example of a matrix MSK described here is non-limiting and other static matrix structures comprising, for example, a repetitive pattern of more than four values, are possible. More generally, it is possible to construct such a matrix so that, for each threshold value taken from the set of possible reference values, the density of samples situated at the level of or below this threshold value, that is to say the number of values Vi of the pattern (and therefore the number of values of the matrix since the pattern is repetitive) equal to or below the threshold value, is proportional to this threshold value, to within an error.

Thus, in the example given above, for a density of 1, the number of values of the pattern below or equal to 1 is equal to 1.

For a density of 2, the number of values of the pattern below or equal to 2 is equal to 2.

For a density of 3, the number of values of the pattern below or equal to 3 is equal to 3.

For a density of 4, the number of values of the pattern below or equal to 4 is equal to 4.

The proportionality factor in the pattern is therefore 1. Within the matrix, it is of course equal to k if the matrix comprises k patterns.

Moreover, for a given density, that is to say for a given threshold value, the arrangement within the pattern, and therefore within the matrix, of the values corresponding to this density (for example the set of values 1, 2 and 3 for a density of 3) is generated pseudo-randomly so as to be sufficiently decorrelated from the content of the multidimensional space, in the case of the image.

Thus, the arrangement within the pattern of the values illustrated in FIG. 16 is only an example and could have been different.

The density matrix MSK is applied repetitively to the image in "raster" format.

Then, as illustrated in FIG. 17, for each current sample (pixel) PR of coordinates $x_i y_j$, there corresponds one of the values Vi of the mask MSK.

The value Vi of the mask associated with this sample is then compared (step 1700) with the first threshold DTH whose value (taken from the four values V1 to V4) has been chosen as a function of the value of the compression rate determined on the preceding block of samples relative to the target value. Also, the result of the comparison will condition the value of the first encoding parameter which is, here, the reference bit ZMAP.

Also, the value of this first encoding parameter ZMAP will define the size of the encoded local digital signal SICL.

More specifically, this reference bit ZMAP is forced to a first logic value, for example, the value 0, when the value Vi of the mask associated with the current sample is below or equal to the first threshold DTH (step 1701).

In this case, the encoded local signal SICL relating to the level of the physical quantity considered comprises, as digital block BSTR, the reference bit ZMAP, the group of second bits representative of the compressed normalized gradient GPANC, the polarity bit POL and the first bits STRC representative of structure of the local coordinate system.

Obviously, the order of these different bits in the digital block BSTR is totally arbitrary and could be different.

In fact, in this case, the forcing to 0 of the encoding parameter (reference bit) ZMAP can be likened to a forcing to a local non-compression of the signal.

Figure 18:
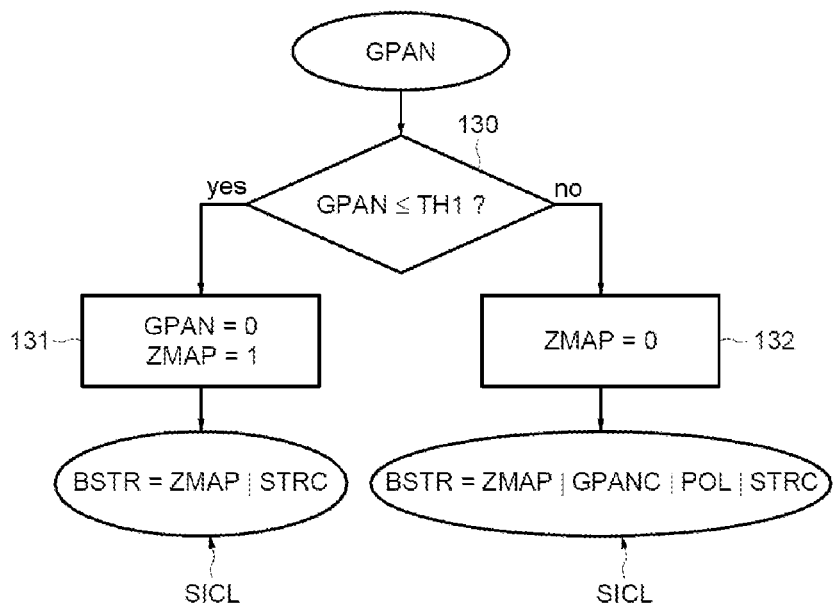

If, however, in the step 1700, the value Vi of the mask associated with the current sample PR is above the first threshold DTH, then the normalized gradient GPAN is compared 130 with a second threshold TH1. Also, the value of the encoding parameter ZMAP will then depend on the result of this comparison 130 as illustrated in FIG. 18.

Thus, if the normalized gradient is below or equal to the second threshold TH1, then ZMAP is equal to 1 whereas, if the normalized gradient GPAN is above the second threshold TH1, then ZMAP equals 0.

The value of the second threshold TH1 depends on the application and on the accuracy desired for the reconstruction of the image.

As an indication, it will be possible to choose a second threshold TH1 equal to 0.1.

If the normalized gradient GPAN is below or equal to the threshold TH1, then the processor MT1 considers that this normalized gradient GPAN is nil (step 131).

In this case, the encoded local signal STCL representative of the physical quantity considered assigned to the sample comprises the digital block BSTR which comprises only the ZMAP bit and the first STRC bits representative of the structure of the local coordinate system.

By contrast, if, in the step 132 the ZMAP bit has been set equal to zero, then the encoded local signal SICL relative to the level of the physical quantity considered comprises, as digital block BSTR, the ZMAP bit, the group of second bits representative of the compressed normalized gradient GPANC, the polarity bit POL the first STRC bits representative of the structure of the local coordinate system.

Obviously, here again, the order of these different bits in the digital block BSTR is totally arbitrary and could be different.

Figure 19:
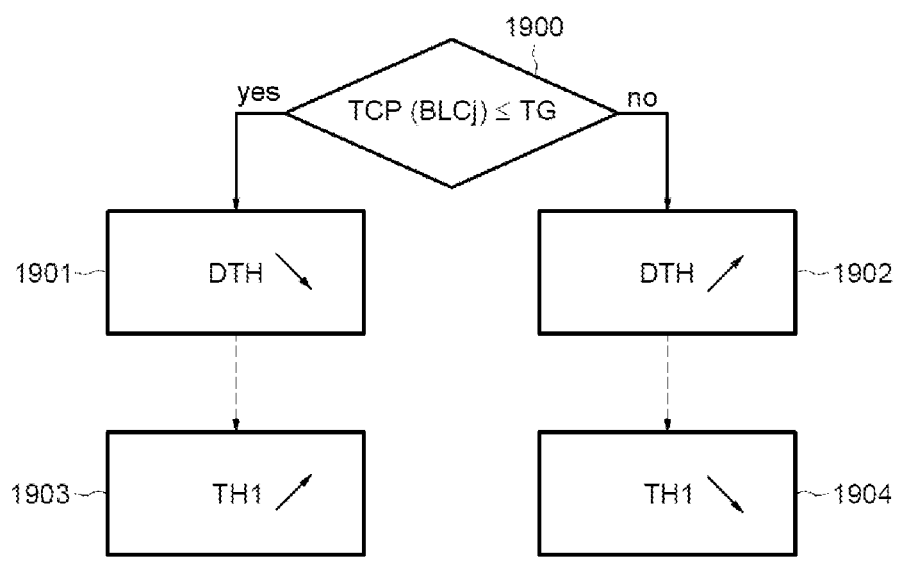

FIG. 19 now schematically illustrates an example of adjustment of the first encoding parameter ZMAP indirectly by an adjustment of the first threshold DTH and, optionally, an adjustment of the second threshold TH1 which is considered here to be a second encoding parameter.

Thus, if, for example, the compression rate TCP evaluated on the current block BLCj of samples is below or equal to the target value TG (step 1900), it is then possible, in step 1901, to lower the value of the threshold DTH, obviously provided that a minimum value has not been reached.

Thus, if, for example, the threshold DTH had been set equal to 3 for the block BLCj, this value can be lowered to the value 2.

If, however, the compression rate TCP is, in the comparison step 1900, above the target value TG, it is then possible, in the step 1902, to increase the value of the first threshold DTH and of course do so only if the maximum value has not already been reached.

Also, this new value for the first threshold DTH will be applied for each pixel of the next block of samples BLCj+1.

It is also possible, optionally but advantageously, to also adjust the value of the second threshold TH1 which is then considered as a second encoding parameter.

More specifically, as illustrated in FIG. 19, in the case where the value of the first threshold DTH is reduced in the step 1901, it is then possible to proceed to increase the value of the second threshold TH1 in the step 1903.

Conversely, if, in the step 1902, the value of the first threshold DTH has been increased, it is then possible to proceed, in the step 1904, to reduce the value of the second threshold TH1.

Also, here again, these new threshold values will be applied for each pixel of the next block of pixels.

Although a combined adjustment of the two thresholds DTH and TH1 as a function of the deviation between the current compression rate and the target value has just been described, it would of course be possible to adjust only the first threshold DTH or possibly consider this threshold DTH as constant and adjust only the second threshold TH1.

In addition to the adjustment(s) of the first encoding parameter and/or of the second encoding parameter which have just been described, it is possible to dynamically control the quantization error for each pixel on the basis of a minimum cumulative error which has been aggregated for all the pixels preceding the current pixel.

This will now be described in more detail, referring more particularly to FIGS. 20 and 21.

The processor MT1 creates, for the first sample PR1 of the sequence, in the step 140 from the compressed normalized gradient GPANC, a first compressed complementary digital word GPANC1 and a second compressed complementary digital word GPANC2 framing the compressed normalized gradient GPANC.

Generally, the term "framing" should be taken in a very broad sense. Thus, the words GPANC1 and GPANC2 can be different from GPANC. That said, in practice, one of the two words GPANC1 or GPANC2 can be taken to be equal to the word GPANC. Also, in the present case, the first word GPANC1 will, for example, be chosen to be equal to the compressed normalized gradient GPANC whereas the complementary digital word GPANC2 will, for example, be slightly higher than the compressed normalized gradient GPANC, for example, by increasing by 1 the least significant bit (LSB) of the compressed normalized gradient GPANC.

The processor MT1 then performs a decompressive decoding 141 of the first complementary digital word GPANC1, by using the same curve as that used for the compression.

A first decompressed complementary digital word GPAND1 is then obtained.

Then, the processor MT1 reconstructs the level APRE1 of the physical quantity considered from the word GPAND1 and from the levels APB and APA.

More specifically, APRE1 is equal to GPAND1(APB−APA)+APA.

The processor then determines, in the step 144, a first error ERR1 equal to the absolute value of the difference between APR and APRE1.

Similarly, the processor MT1 performs a decompressive decoding of the second complementary digital word GPANC2 so as to obtain a decompressed word GPAND2 then reconstruct, in the step 145, the level APRE2 of the physical quantity considered from the word GPAND2 and from the levels APB and APA in a way similar to that which was done in the step 142.

The processor then determines a second error ERR2 in the step 147 equal to the absolute value of the difference between APR and APRE2.

The processor MT1 then determines, in the step 148, the lowest error ERRF and consequently selects, in the step 149, the selected compressed complementary digital word GPANCS as being that of the two words GPANC1 or GPANC2 associated with the lowest error.

Moreover, this lowest error ERRF is stored in an accumulation register (step 1480).

Figure 20:
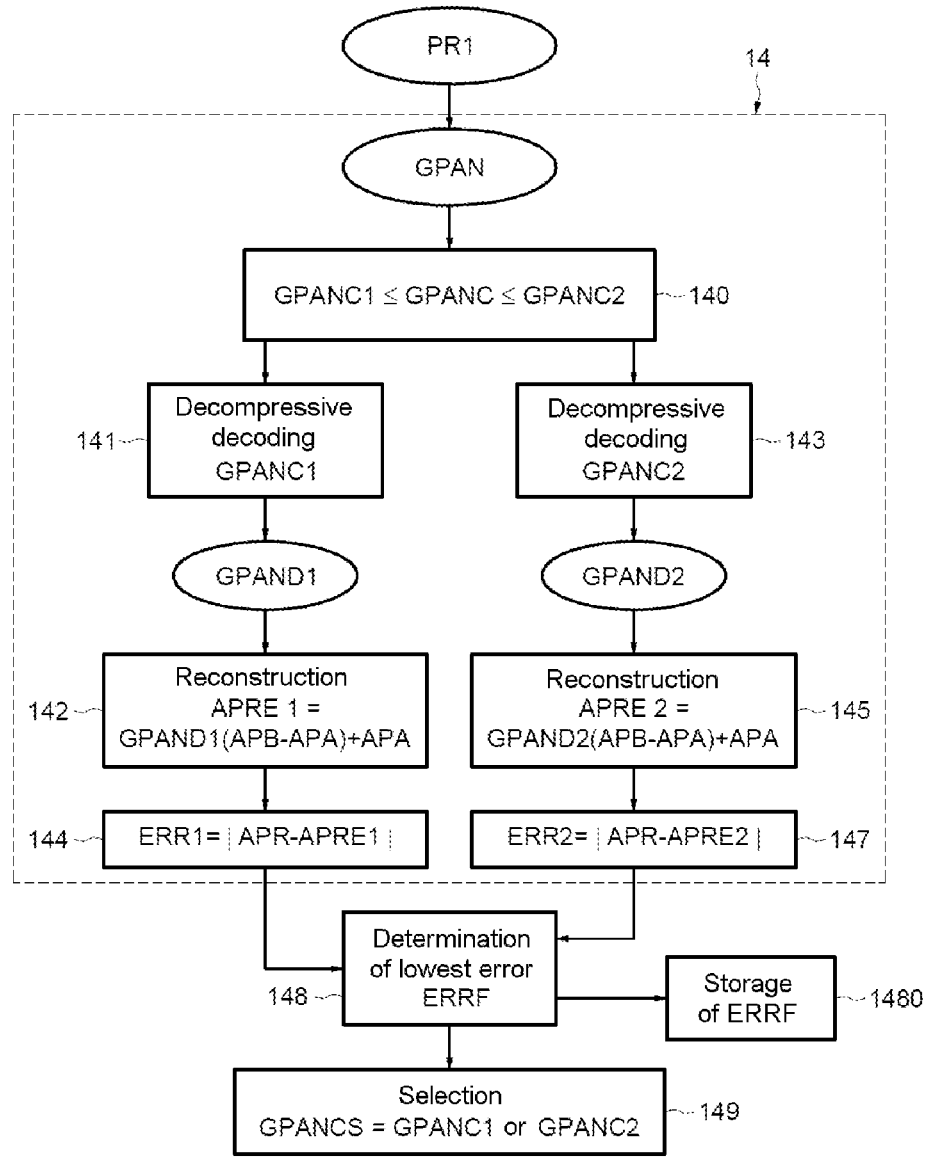
Figure 21:
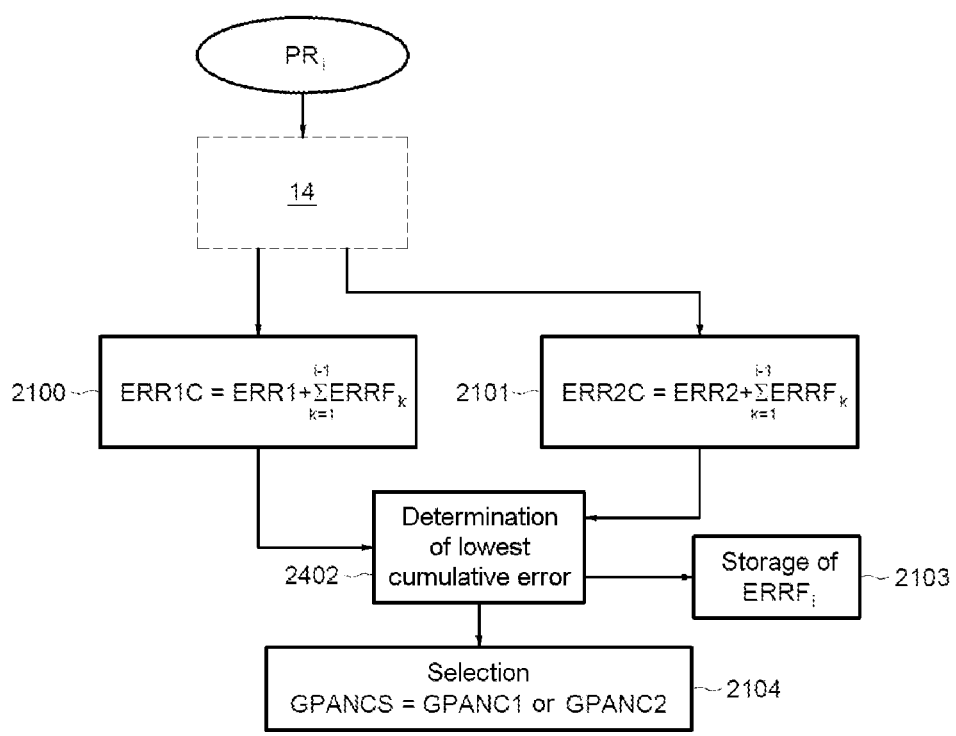

Then, as illustrated in FIG. 21, for each next current sample PRi, the block of steps 14 of FIG. 20 is repeated and, in a step 2100, a first cumulative error ERR1C is generated equal to the sum of the first error ERR1 and all of the lowest errors ERRFk (k=1 to i−1) associated with the preceding samples.

Similarly, in the step 2101, a second cumulative error ERR2C is generated equal to the sum of the second error ERR2 and of all the lowest errors ERRFk associated with the preceding samples.

Then, in the step 2102, the lowest cumulative error out of the two cumulative errors ERR1C and ERR2C is determined.

Then, in the step 2104, that of the first compressed complementary digital word GPANC1 or of the second compressed complementary digital word GPANC2 which gives the lowest error out of the first cumulative error and the second cumulative error is selected.

Figure 22:
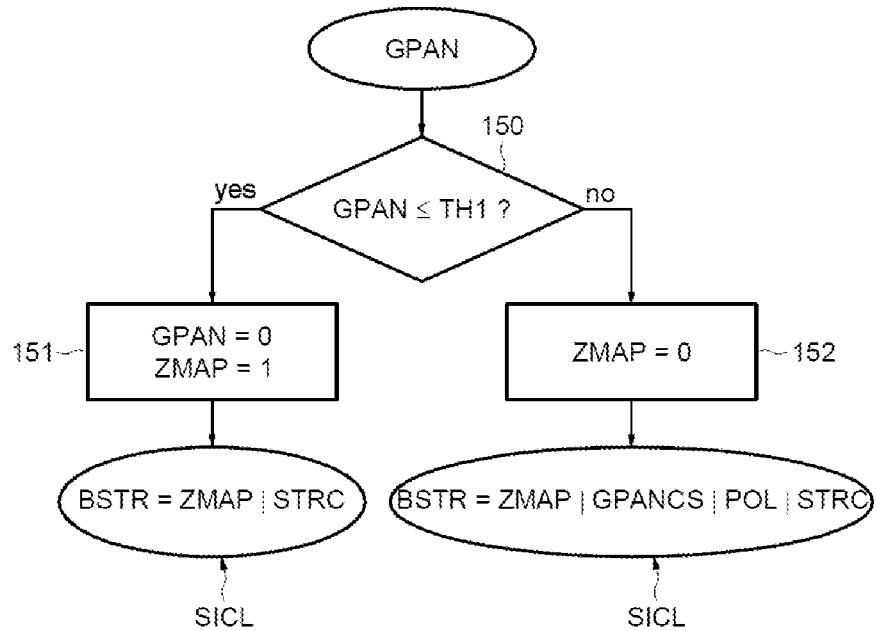

Also, as illustrated in FIG. 22, in the case where the ZMAP bit is equal to zero, the encoded local signal SICL comprises the digital block BSTR this time including the selected compressed digital word GPANCS in place of the compressed normalized gradient GPANC.

In another variant, it would be possible to use as parameter, not the normalized gradient GPAN, but, directly, GPA', that is to say the absolute value of the difference between APR and APA, that is to say the absolute value of the first gradient GPA as has been described in the French patent application mentioned previously.

So as to randomly disperse the quantization error, it is particularly advantageous to add, to the normalized gradient GPAN or else to the compressed normalized gradient GPAC or else to GPA', a pseudo-random quantity.

Figure 23:
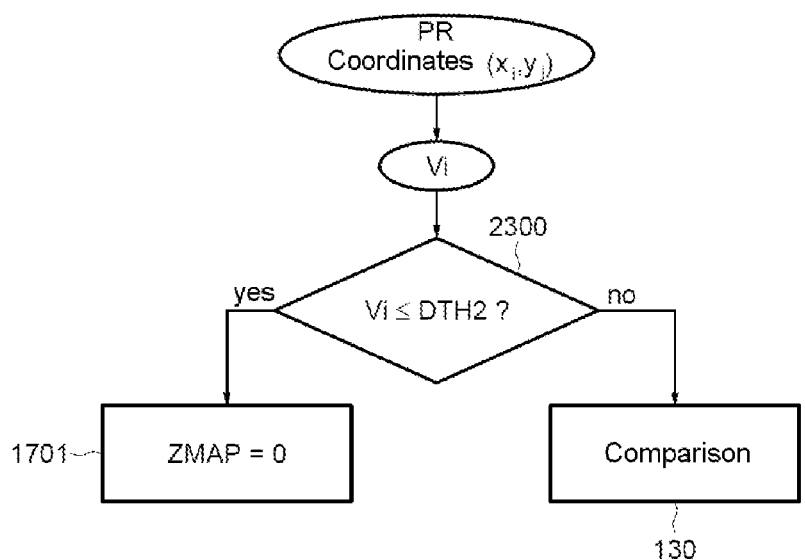

So as to further refine the dynamic control of the encoding to obtain a better stabilization of the compression rate with respect to the target compression rate, it is particularly advantageous, as illustrated in FIG. 23, to classify each sample PR of the sequence in a class belonging to a set of classes, here, for example, three classes CL1, CL2, CL3, and to adjust at least the value of the first threshold DTH as a function of the class.

Thus, the class CL1 will be assigned a first threshold DTH1, the class CL2 will be assigned a first threshold DTH2 and the class CL3 will be assigned a first threshold DTH3

In the example illustrated in FIG. 23, it is assumed that the current pixel PR belongs to the class CL2. In this case, in the step 2300, the value Vi associated with this pixel PR in the mask MSK is compared to a threshold DTH2 to determine whether, as described with reference to FIG. 17, to force the ZMAP bit to zero in the step 1701 or whether to proceed to the comparison step 130.

By way of indication, the set of classes here comprises a first class CL1 associated with the samples belonging to a zone in which the gradients of the at least one physical quantity are uniform, a second class CL2 associated with the samples in which the gradients of the at least one physical quantity are local extrema, and a third class associated with the samples belonging to at least one outline of the multidimensional space, in this case an outline of the image.

As an example, the class 1 contains each pixel for which the gradient is below or equal to a limit value, for example, 0.01. By way of example, the class 3 contains each pixel for which the gradient is above or equal to this limit value, for example, 0.01.

Figure 24:
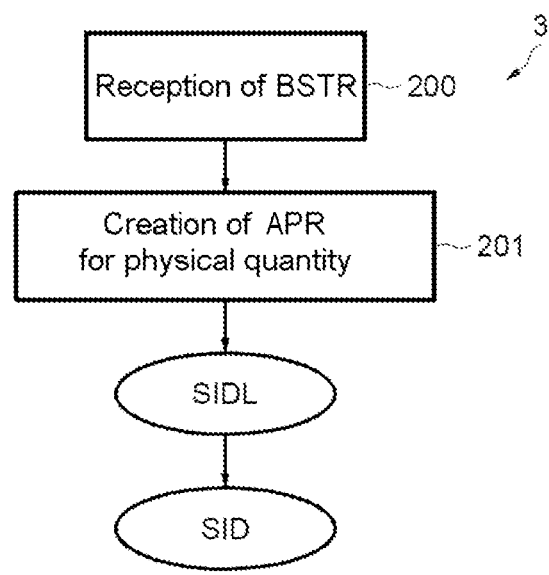

In reception, as illustrated in FIG. 24, the processor MT2 will create, for each current sample and for which each physical quantity assigned to this current sample, the level of the physical quantity considered from the digital block BSTR received in the step 200 so as to deliver a decoded local signal SIDL, that is to say deliver the level of the physical quantity considered.

The set of the decoded local signals SIDL forms a decoded signal SID.

This creation will take account of the content of the digital block BSTR received, and in particular the values of the ZMAP and STRC bits, and possibly of the POL and GPAC or POL and GPANC bits.

It is assumed here that the parameter possibly used was normalized gradient GPAN.

If the ZMAP bit is equal to 1, that means that the case was that in which GPAN was nil and consequently, the value of the physical quantity assigned to the current sample PR is simply equal to the APA value of this physical quantity assigned to the reference sample A.

This sample A has already been processed previously.

Consequently, the APA value is known.

Furthermore, the STRC bits make it possible to determine the configuration of the local coordinate system and consequently the coordinates of this sample A in the matrix of pixels.

In the case where the ZMAP bit is equal to zero, several cases can be envisaged.

In the case where the polarity bit POL is at 1, that is to say in the case of an extrapolation configuration, the APR level of the physical quantity considered is recomputed from the following formula:

$$APR=APA+(APB-APA)GPAN/(2GPAN-1) \quad (1)$$

In this formula, GPAN has been obtained by a decompressive decoding of GPANC (or of GPANCS).

It should be noted that the formula (1) is valid for the two possible cases of extrapolation, that is to say in the case where APB is below or equal to APA which is itself below or equal to APR, and in the case where APB is above or equal to APA which is itself above or equal to APR.

In the case where the polarity bit POL is zero, that is to say in an interpolation case, the APR level of the physical quantity considered is recomputed from the formula (2) or the formula (3) below:

$$APR=APA-APA \cdot GPAN+APB \cdot GPAN \quad (2)$$

$$APR=APB+APA \cdot GPAN-APB \cdot GPAN \quad (3)$$

depending on whether APA is less than or greater than APB, respectively.

More specifically, if APA is below or equal to APR itself below or equal to APB, then the formula (2) applies.

If APB is below or equal to APR which is itself below or equal to APA, then the formula (3) applies.

Also, the condition APA is smaller than or greater than APB is determined by the processor MT2 itself since these levels are already known because they are assigned to samples already processed.

In the case where the parameter used in the encoding is the absolute value GPA' of the first gradient GPA (GPA'=|GPA|=|APR-APA|), and the POL bit is representative of the sign of APR-APA ((POL)=sign(APR-APA)), then, in the case where ZMAP=0, the APR level of the physical quantity assigned to the current sample PR is reconstructed by the following formulae:

$$APR=APA+GPAC \text{ if } POL=0$$

$$APR=APA-GPAC \text{ if } POL=1$$

GPAC being the compressed parameter received in the digital block BSTR.

Obviously, if ZMAP=1, then, as in the preceding variant, APR=APA.

The invention is not limited to the implementations and embodiments which have just been described, but encompasses all the variants.

Figure 25:
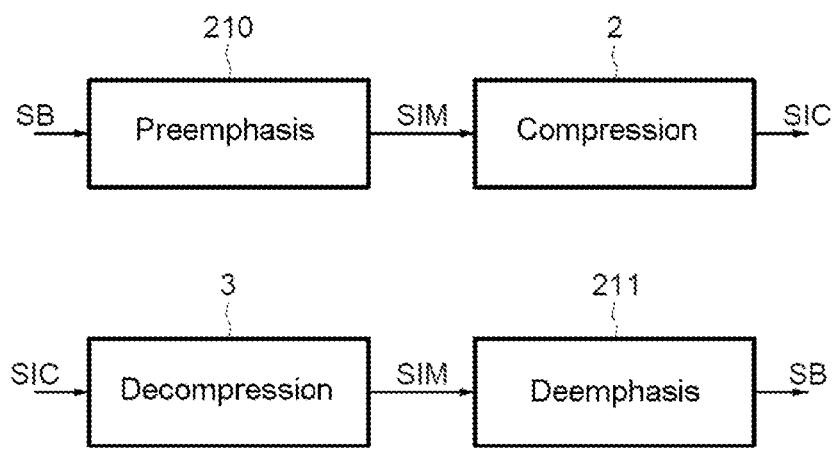

Thus, as illustrated in FIG. 25, it is particularly advantageous to have the encoding 2 preceded by a pre-emphasis pre-processing performed, for example, conventionally, by a correction $\gamma$ ($x^{-\gamma}$) or using a perceptual quantization curve or even with a curve of the S type or using look-up table.

In this case, the decoding 3 is followed by a de-emphasis post-processing 211 using a reverse function of the function used in the processing 210.

In some cases, the sequence of samples, for example, the sequence of pixels, can be decomposed into subsequences.

Figures 26, 27:
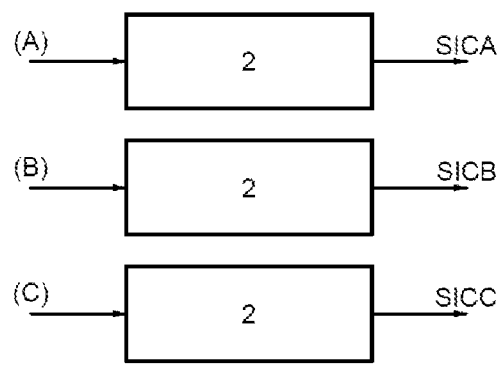

Such is the case, for example, as illustrated in FIG. 26 in which the pixels are encoded in the YCB format 420.

More specifically, the subsequence (A) (of the pixels) comprises the pixels assigned the components $YC_bC_r$.

The subsequence (B) comprises the pixels assigned components Y and the subsequence (C) comprises the pixels framed by the pixels of the subsequence (B) and also assigned the component Y.

In this case, the processor MT1 can apply, in succession or in parallel (FIG. 27), the encoding processing and the encoding parameter(s) adjustment loop which have just been described in the sub-sequences (A), (B) and (C) respectively, so as to deliver encoded signals SICA, SICB and SICC. Obviously, in this case, for the subsequence (A) for example, the pixels neighboring a current pixel (A) will be chosen from the pixels (A) adjacent to this current pixel (A).

The same applies for the pixels (B) and (C).

Moreover, in some cases, certain samples may not be subjected to the encoding processing which has just been described.

More specifically, for some predefined sample positions, which are known by the encoding device and the decoding device, it would be possible to transmit directly, for each physical quantity considered, its APR level without it being necessary to transmit the ZMAP bit. Such is the case, for example, for each pixel of the first line and of the first column of a frame or of a macroblock or even for the first pixels of a frame or of a macroblock examined helically.

Moreover, in some applications notably requiring a higher accuracy, it is possible, after having determined the ZMAP bit for a current sample to not compute the compressed normalized gradient GPANC or the absolute value GPA' of the first gradient GPA and directly transmit the APR level of the physical quantity considered.

In this case, if the ZMAP bit is equal to zero, then the digital block BSTR comprises the ZMAP bit followed by the APR level whereas, if the ZMAP bit is equal to 1, the digital block BSTR comprises this ZMAP bit followed by the first STRC bits.

What is claimed is:

1. A method comprising:
   performing a plurality of localized encodings of a digital signal to generate a set of encoded local signals,
   wherein localized encodings are performed for a first sample of the digital signal,
   wherein a plurality of physical quantities is assigned to the first sample, and
   wherein the set of encoded local signals comprises an encoded local signal associated with each physical quantity of the plurality of physical quantities;
   analyzing a characteristic associated with an encoded signal to determine a measured value of the characteristic, wherein the encoded signal comprises the set of encoded local signals; and
   adjusting a first encoding parameter associated with the plurality of localized encodings according to the measured value of the characteristic and a target value of the characteristic,
   wherein the first encoding parameter is adjusted for a second sample of the digital signal, and
   wherein the second sample is processed after the first sample.

2. The method according to claim 1, wherein:
performing the plurality of localized encodings of the digital signal comprises performing the plurality of localized encodings for a first block of samples of the digital signal comprising the first sample; and
adjusting the first encoding parameter comprises adjusting the first encoding parameter for a second block of samples of the digital signal comprising the second sample, wherein the second block of samples is processed after the first block of samples.

3. The method according to claim 1, wherein the first encoding parameter is a reference bit, and wherein adjusting the first encoding parameter comprises indirectly adjusting the first encoding parameter by indirectly adjusting an intermediate parameter.

4. The method according to claim 3, further comprising:
directly adjusting a second encoding parameter associated with the plurality of localized encodings according to the measured value of the characteristic and the target value of the characteristic, wherein the second encoding parameter is a threshold value, and wherein the second encoding parameter is adjusted for the second sample.

5. The method according to claim 1, wherein the first encoding parameter is a threshold value, and wherein adjusting the first encoding parameter comprises directly adjusting the first encoding parameter by directly adjusting the threshold value.

6. The method according to claim 1, wherein the characteristic associated with the encoded signal is a compression rate of the encoded signal relative to the digital signal.

7. The method according to claim 1, wherein the characteristic associated with the encoded signal is a noise level of the encoded signal relative to the digital signal.

8. The method according to claim 1, wherein the digital signal is an image signal.

9. The method according to claim 1, wherein the digital signal is an audio signal.

10. The method according to claim 1, wherein the digital signal is a data signal.

11. A device comprising:
a processor; and
a non-transitory computer-readable storage medium storing a program to be executed by the processor, the program including instructions for
performing a plurality of localized encodings of a digital signal to generate a set of encoded local signals,
wherein localized encodings are performed for a first sample of the digital signal,
wherein a plurality of physical quantities is assigned to the first sample, and
wherein the set of encoded local signals comprises an encoded local signal associated with each physical quantity of the plurality of physical quantities,
analyzing a characteristic associated with an encoded signal to determine a measured value of the characteristic, wherein the encoded signal comprises the set of encoded local signals,
adjusting a first encoding parameter associated with the plurality of localized encodings according to the measured value of the characteristic and a target value of the characteristic,
wherein the first encoding parameter is adjusted for a second sample of the digital signal, and
wherein the second sample is processed after the first sample.

12. The device according to claim 11, wherein
performing the plurality of localized encodings of the digital signal comprises performing the plurality of localized encodings for a first block of samples of the digital signal comprising the first sample; and
adjusting the first encoding parameter comprises adjusting the first encoding parameter for a second block of samples of the digital signal comprising the second sample, wherein the second block of samples is processed after the first block of samples.

13. The device according to claim 11, wherein the first encoding parameter is a reference bit, and wherein adjusting the first encoding parameter comprises indirectly adjusting the first encoding parameter by indirectly adjusting an intermediate parameter.

14. The device according to claim 13, wherein the program further includes instructions for:
directly adjusting a second encoding parameter associated with the plurality of localized encodings according to the measured value of the characteristic and the target value of the characteristic, wherein the second encoding parameter is a threshold value, and wherein the second encoding parameter is adjusted for the second sample.

15. The device according to claim 11, wherein the first encoding parameter is a threshold value, and wherein adjusting the first encoding parameter comprises directly adjusting the first encoding parameter by directly adjusting the threshold value.

16. The device according to claim 11, wherein the characteristic associated with the encoded signal is a compression rate of the encoded signal relative to the digital signal.

17. The device according to claim 11, wherein the characteristic associated with the encoded signal is a noise level of the encoded signal relative to the digital signal.

18. The device according to claim 11, wherein the digital signal is an image signal.

19. The device according to claim 11, wherein the digital signal is a data signal.

20. A non-transitory computer program product comprising a computer readable medium storing software code portions for execution of an encoding method comprising:
performing a plurality of localized encodings of a digital signal to generate a set of encoded local signals,
wherein localized encodings are performed for a first sample of the digital signal,
wherein a plurality of physical quantities is assigned to the first sample, and
wherein the set of encoded local signals comprises an encoded local signal associated with each physical quantity of the plurality of physical quantities;
analyzing a characteristic associated with an encoded signal to determine a measured value of the characteristic, wherein the encoded signal comprises the set of encoded local signals; and
adjusting a first encoding parameter associated with the plurality of localized encodings according to the measured value of the characteristic and a target value of the characteristic,
wherein the first encoding parameter is adjusted for a second sample of the digital signal, and
wherein the second sample is processed after the first sample.

* * * * *